United States Patent
Chatterjea

(10) Patent No.: US 6,330,799 B1
(45) Date of Patent: Dec. 18, 2001

(54) ADAPTIVE COOLING SYSTEM CONTROL SYSTEM

(76) Inventor: Probir Chatterjea, 211 Darien La., Sleepy Hollow, IL (US) 60118

( * ) Notice: Subject to any disclaimer, the term of this patent is extended or adjusted under 35 U.S.C. 154(b) by 0 days.

(21) Appl. No.: 09/493,046

(22) Filed: Jan. 26, 2000

(51) Int. Cl.[7] .................................................. F16D 39/00
(52) U.S. Cl. ............................................. 60/456; 60/468
(58) Field of Search ...................................... 60/456, 468

(56) References Cited

U.S. PATENT DOCUMENTS

| | | | |
|---|---|---|---|
| 4,738,330 | * | 4/1988 | Suzuki et al. ........................... 60/450 |
| 4,798,050 | * | 1/1989 | Nakamura et al. ..................... 60/468 |
| 5,881,630 | * | 3/1999 | Buschur et al. ........................ 60/468 |
| 6,158,216 | * | 12/2000 | Buschur et al. ....................... 60/456 |

* cited by examiner

Primary Examiner—William E. Tapolcai
Assistant Examiner—Mohammad M. Ali
(74) Attorney, Agent, or Firm—Factor & Partners, LLC

(57) ABSTRACT

An adaptive cooling system control system for controlling fluid delivery from a pump to a fan motor comprises an inlet, an outlet and a speed control structure. The inlet receives fluid from a pump. The outlet delivers the fluid to a fan motor. The speed control structure controls the speed of the fan motor, and comprises a valve including a first passage in fluid communication with the inlet and the outlet, and a bypass passage selectively communicable with the inlet, the bypass passage being placed in communication with the inlet upon receiving fluid from a pump in excess of a predetermined desired quantity of such fluid.

26 Claims, 3 Drawing Sheets

ADAPTIVE COOLING SYSTEM CONTROL SYSTEM

BACKGROUND OF THE INVENTION

1. Field of the Invention

The invention relates in general to cooling systems, and more particularly to an adaptive cooling control system for use primarily in association with cooling operating fluids of heavy construction equipment. The invention is not however limited thereto, and may be adapted for use in association with the cooling systems of different equipment and machinery.

2. Background Art

The use of cooling systems for internal combustion engines and the like has long been known in the art. The engine and transmission are cooled by the circulation of fluids. Such fluids generally include engine coolant, oil, transmission fluid, steering fluid, and hydraulic fluid, among others. Generally, fans are used to cool heat exchangers (radiators) which carry the various fluids. The fans can be operated in many different manners, such as through an electric motor, a hydraulic motor or the fan may be driven directly by the engine crankshaft.

While these solutions have proved successful, they do have certain drawbacks. For example, electric fans generally place large loads upon the alternator and are rather expensive solutions. Fans driven by the crankshaft are in constant rotation—even when not needed—rendering them inefficient. Furthermore, in certain cold climates, with a directly driven fan the operating fluids may not even reach the proper elevated operating temperatures.

To solve such problems, variable speed fans have been utilized. Such fans have been powered by hydraulic pumps associated with the engine. In particular, the pump that rotates with the crankshaft powers the fan motor. Such a solution, while an improvement over the above-identified solutions, nevertheless suffers from certain drawbacks. For example, since pump speed is directly associated with engine speed, such fans include continuously variable thermostatic control devices to control the speed of the fan independently from the speed of the engine and pump. As a result these complex systems require frequent maintenance and are quite expensive to produce and maintain.

It is therefore an object of the invention to provide an improved control system for a hydraulic cooling fan that overcomes the shortcomings of the prior art.

It is another object of the invention to provide a control system which can utilize commercially available components so as to enhance durability and to minimize cost.

These and other objects of the invention will become apparent in light of the specification and claims appended hereto.

SUMMARY OF THE INVENTION

The invention comprises an adaptive cooling system control system for controlling fluid delivery from a pump to a fan motor. The system includes an inlet, an outlet and primary speed controlling means. The inlet receives fluid from a pump. The outlet delivers fluid to a fan motor. The primary control means comprises a bypass valve which includes a first passage which is in fluid communication with the inlet and the outlet. In addition, a bypass passage is selectively communicable with the inlet. The bypass passage is placed into fluid communication with the inlet upon receiving fluid from a pump which in excess of a predetermined desired quantity of such fluid.

In a preferred embodiment, the bypass valve further includes means for altering the quantity of excess fluid flow required to place the bypass passage into communication with the inlet.

In another preferred embodiment, the bypass valve includes a flow control float and means for biasing same. The flow control float is slidably positionable relative to the inlet. The biasing means biases the flow control float between the inlet and the bypass passage, wherein a predetermined flow rate is capable of overcoming the biasing means, in turn, placing the inlet into fluid communication with the bypass passage. In such a preferred embodiment, the biasing means may further provide for means for adjusting the biasing means to alter the quantity of fluid flow required to place the bypass passage into fluid communication with the inlet.

In yet another preferred embodiment, the system further includes a pressure relief valve to preclude undesirable elevated fluid pressure within the system.

In another embodiment, the system further includes means for minimizing cavitation of the fan after fluid delivery from the pump ceases. In such an embodiment, wherein the system further includes a return passage from the outlet of the fan motor, the cavitation minimizing means comprises means for circulating fluid from the return passage into the inlet until the pressure in the return passage falls below a predetermined pressure.

In another such preferred embodiment, the circulating means further comprises a first check valve and a second check valve. The first check valve includes a first rating, an open position and a closed position. The first check valve is associated with the return passage and provides a fluid conduit from the return passage to a fluid outlet when in the open position. The second check valve includes a second rating, an open position and a closed position. The second check valve is associated with the return passage, wherein the second check valve provides a fluid conduit between the return passage and the inlet when in the open position. In this embodiment, the second rating is a pressure higher than the first rating. Upon cessation of fluid delivery from a pump, and decrease in flow of fluid in the inlet, the second check valve returns to the closed position, and the first check valve is prompted into the open position. In turn, circulation of fluid from the return passage through the first check valve into the inlet is facilitated until the pressure within the return passage falls below a predetermined pressure.

In such an embodiment, the first rating is less than 5 psi, and the second rating is less than 30 psi. In another such embodiment, the fluid outlet is associated with a fluid reservoir.

In a preferred embodiment, the system further comprises secondary means for controlling the fluid flow to a fan motor. In such an embodiment, the secondary means comprises a second valve positioned between the inlet and the outlet. The second valve is selectively positionable so as to selectively provide a conduit between the inlet and the outlet.

In such a preferred embodiment, the second valve includes at least one sensor and means associated with the at least one sensor for activating the selective positioning of the valve. In another such embodiment, the at least one sensor comprises at least one of a temperature sensor, a pressure sensor and a manually activated switch.

Preferably, the activating means of such an embodiment comprises a solenoid associated with the at least one sensor. Upon energization of the solenoid the valve is positioned such that the inlet and the outlet are in fluid communication.

In another such preferred embodiment, the secondary means further includes means for adjusting the fluid flow capacity of the conduit between the inlet and the outlet. In such a preferred embodiment, the adjusting means comprises a selectively positionable plunger positioned within the conduit.

In another embodiment, the adjusting means comprises means for automatically adjusting the quantity of fluid directed through the conduit based on predetermined sensed conditions.

In such an embodiment, the automatic adjusting means comprises a selectively positionable plunger, a logic controller, at least one sensor and a stepper motor. The plunger is positioned within the conduit of the secondary means. The at least one sensor is associated with the controller. The stepper motor is associated with the controller and the plunger. Rotation of the stepper motor which is controlled by the controller in response to an input received from the at least one sensor, operably alters the position of the plunger to facilitate one of greater or lesser fluid flow through the conduit.

In a preferred embodiment, the secondary flow control means further includes means for bypassing the outlet, to in turn, substantially preclude rotation of a fan. In such an embodiment, the system further includes means for selectively activating the bypassing means.

DETAILED DESCRIPTION OF THE DRAWINGS

Figure 1:
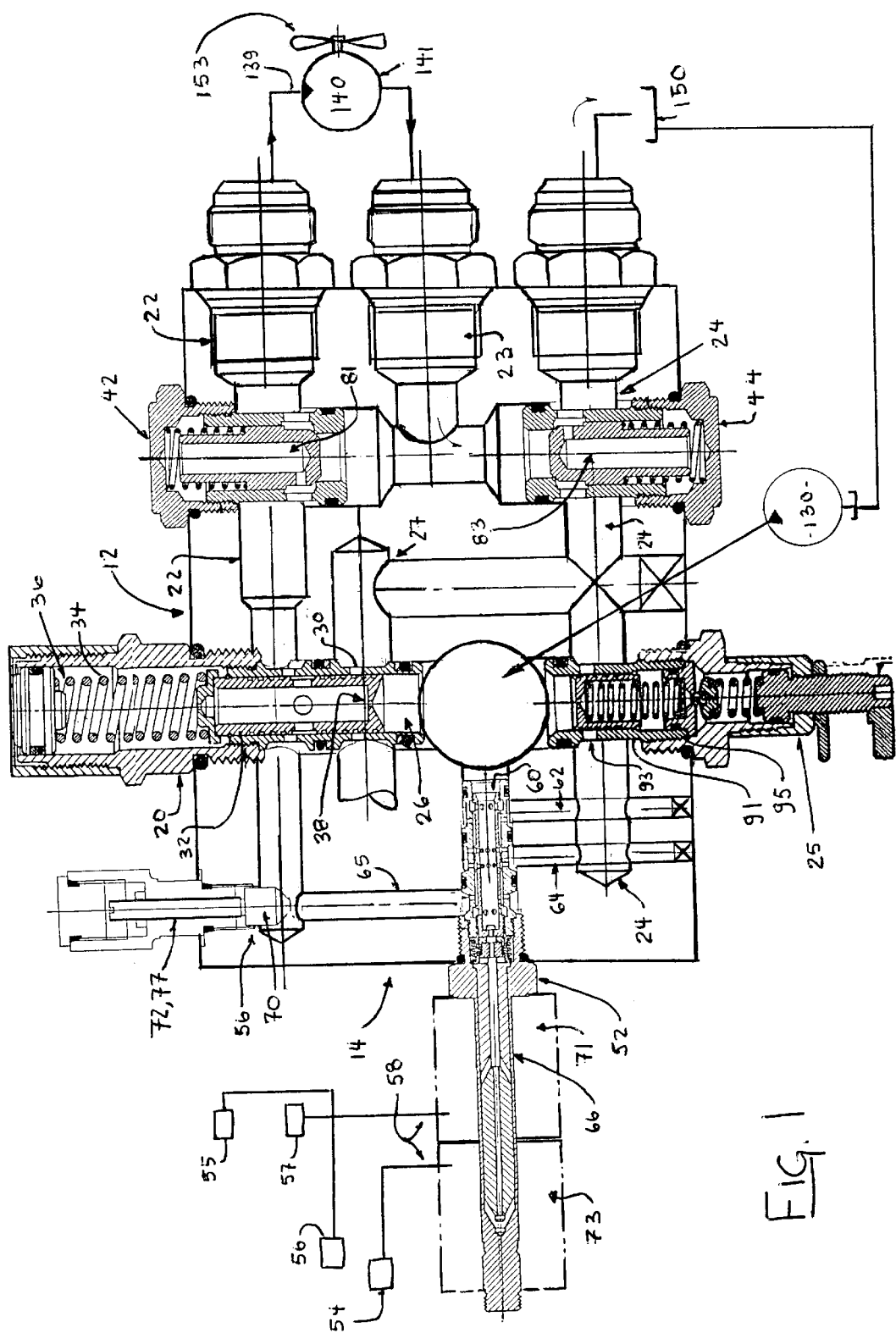
FIG. 1 of the drawings is a schematic cross-sectional view of the control system of the present invention.

While this invention is susceptible of embodiment in many different forms, there is shown herein in the drawings and will be described in detail several specific embodiments, with the understanding that the present disclosure is to be considered as an exemplification of the principles of the invention and is not intended to limit the invention to the embodiments illustrated.

Figure 2:
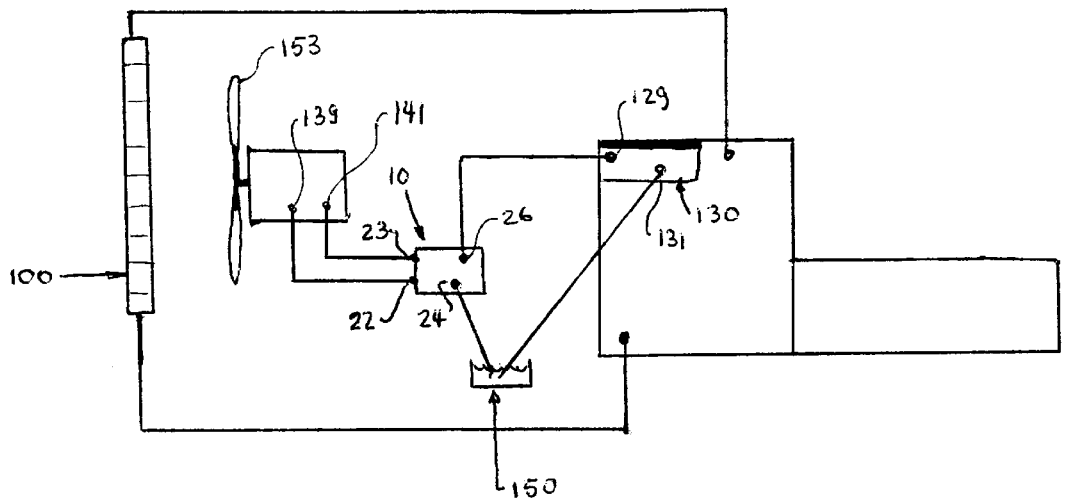
FIG. 2 of the drawings is a schematic depiction of the cooling system having the control system of the present invention.

Adaptive cooling system control system 10 is shown in FIG. 2 as comprising a portion of the cooling system of a vehicle. The cooling system includes heat exchanger 100 within which a fluid from engine 110 is circulated. Further, motor 110 drives pump 130 which circulates a hydraulic fluid through control system 10 to drive fan motor 140 which rotates fan 153. Fan 153 drives air at an increased volumetric flow past heat exchanger 100 to cool the fluid therewithin. Excess fluid for use by pump 130 is stored in reservoir 150, and fluid which was used to power fan motor 140 is returned to reservoir 150 for recirculation by pump 130. Generally, the vehicle comprises a construction equipment, such as, for example, a bulldozer, a crawler or a loader. Of course, such cooling systems, and in particular the pump control system, can be applied to other construction equipment such as trucks, graders, excavators as well as to other vehicles and machinery not associated with construction equipment.

Cooling control system 10 is shown in detail in FIG. 1 as comprising primary means 12 for controlling the speed of the fan and secondary means 14 for controlling the speed of the fan. The primary speed control means controls the typical operation of the fan for cooling purposes. The secondary speed control means controls the operation of the fan when certain predetermined conditions arise.

Primary fan speed control means comprises bypass valve assembly 20, passage 22, passage 23 and passage 24. Bypass valve 20 assembly includes inlet 26, outlet 28, bypass outlet 30, flow control float 32, biasing means 34 and adjustment means 36. Inlet 26 is associated with the output from pump 130 and includes pressure relief valve 25. Pressure relief valve 25 is positioned such that at a predetermined pressure (such as a pressure in excess of 1700 psi), spring 91 will be compressed such that put on 91 moves and exposes outlet 93. At such time, inlet 26 and outlet passage 24 are in fluid communication. In turn, fluid directed from pump 130 will immediately be directed via outlet 93 into passage 24 and in turn into reservoir 150. Such an arrangement protects pump 130, fan motor 140 the assorted fluid lines, as well as control unit 10 should a undesirably high fluid pressure condition result within the system. Such a condition can occur if one on the passages becomes block or restricted, for example.

Outlet 28 is associated with passage 22 so as to be in fluid communication therewith. Bypass outlet 30 is in fluid communication with passage 27 which is in fluid communication with passage 24. Flow control float is positioned within bypass valve assembly 20 and is permitted to slidably move within bypass valve 20. Flow control float 32 includes orifice 37, front plate 39 and opening 38. Orifice 37 and opening 38 provide fluid communication between inlet 26 and passage 22. With no fluid flow, biasing means 34 forces flow control float 32 toward inlet 26 so as to seal bypass outlet 30 from fluid communication with inlet 26. As the fluid flow increases to a predetermined flow rate, the biasing means is overcome and the fluid is forced against plate 39 to direct flow control float 32 away from inlet 26. At a certain predetermined desired flow rate, the fluid pushes plate 39 and fluid control float 32 so as to expose bypass outlet 30, to in turn, render bypass outlet 30 and inlet 26 in fluid communication. Generally, while other embodiments are contemplated, movement of the float does not significantly alter the flow through orifice 37 during operation.

Adjustment means 36 comprises means for altering the length of biasing means 34, which, in turn, alters the force required to overcome biasing means 34 and move flow control float 32. Such a bypass flow control assembly 20 is commercially available from Vickers as model number PFR2-10/16. Of course other suitable control valves are likewise contemplated for use, as long as they provide a bypass opening at a certain predetermined fluid flow rate.

Inlet passage 22 extends to inlet 139 of fan motor 140. Return passage 23 extends from outlet 141 of fan motor 140 into control system 10. Outlet passage 24 is opposite check valve 44 and is in fluid communication with reservoir 150.

Passage 22 and passage 23 include means for precluding cavitation of fan 140 after the pump 130 ceases providing fluid. The cavitation precluding means comprises means for facilitating continued circulation of the fluid proximate fan motor 140 until the pressure in return passage 23 falls below a predetermined pressure. The circulation means comprises first check valve 42 associated with passage 22 and passage 23, and second check valve 44 associated with passages 23 and 24. First check valve 42 is rated at a particular pressure and includes cavity 81 which is in fluid communication with passage 22. Pressure from fluid within cavity 81 and passage 22 counteracts pressure from within passage 24. As long as the pressure in cavity 81 is greater than the pressure in passage 24, and the difference is greater than the pressure rating of first check valve 42, the first check valve will remain in the closed position which is shown in FIG. 1. Otherwise, the check valve will open and remain in the open position. In the open position, the first check valve provides a conduit for passage of fluid from passage 23 through the check valve into passage 22 for recirculating to fan motor 140.

Similarly, second check valve 44 includes cavity 83 which is in fluid communication with passage 24. Pressure from within cavity 83 counteracts pressure from within passage 23. As long as the pressure in cavity 23 is greater than the pressure in cavity 24, and the difference is greater than the pressure rating of the second check valve, the check valve will be opened the check valve provides a conduit for passage of fluid from passage 23 into passage 24, and in turn, into reservoir 150.

In this embodiment, check valve 42 has a lower rating than check valve 44. As will be explained, this permits the fluid, after pump 130 is deactivated, to overcome first check valve 42, but not check valve 44. This, in turn, facilitates circulation and prevents cavitation. While not limited thereto, in the embodiment shown, check valve 42 has a rating of about 5 psi, and check valve 44 has a rating of about 20 psi (generally less than 30 psi). Of course, particular check valve ratings will tend to vary depending on the particular application.

Secondary speed control means 14 comprises control valve 52 and flow adjustment means 56. Control valve 52 includes means 58 for receiving an input from at least one sensor such as sensor 54, a inlet 60, first outlet 62, second outlet 64, third outlet 65 and means 66 for associating the inlet with at least one of the outlets 62, 64 and 65. Outlets 62 and 64 are in fluid communication with passage 24, and in turn, reservoir 150. Outlet 65 is in selective fluid communication with passage 22.

The receiving means has the capability of receiving input from multiple sensors namely sensors 54–57. In the embodiment shown in FIG. 2, the associating means 66 comprises first solenoid 71 and second solenoid 73, wherein each solenoid is attached to at least one sensor. Energization of second solenoid 73 places inlet 60 in fluid communication with third outlet 65 and likewise places first outlet 63 in fluid communication with second outlet 64. Activation of first solenoid 71 places first inlet in fluid communication with outlet 63 and outlet 64 in fluid communication with outlet 65. Such a solenoid is available commercially from Vickers as model number SV-9-10. Of course, other means, i.e., mechanical or electrical may be utilized to provide fluid communication between at least inlet 60 and outlet 65 upon sensing of a certain condition.

As will be explained in more detail below with respect to the method, sensors 54 and 56 may comprise temperature sensors which measure temperature of the working fluids, the engine/transmission itself, the ambient temperature. The sensors may, however, comprise pressure sensors or even manually operated switches.

Outlet 65 is associated with flow adjustment means 56, and in turn provides a conduit for selective communication with passage 22. Flow adjustment means 56 comprises plunger 70 positioned between passages 65 and 22, and, means 72 for orientating the plunger within passage 22. Orientating means 72 comprises a threaded member 77 associated with plunger 70, wherein rotation of threaded member in a first direction forces plunger 70 into passage 22 to constrict the permitted fluid flow from passage 65 into passage 22, whereas rotation of threaded member in a second direction pulls plunger 70 away from passage 22 to permit greater fluid flow from passage 65 into passage 22. The threaded member 77 may be manually rotated, adjusted and set by a screwdriver, for example, to restrict passage of fluid to a predetermined desired flow. Preferably, the threaded member is set at a predetermined setting at the factory during assembly. The factory can adjust the setting to compensate for varying worldwide climates and conditions under which the equipment will operate. However, it is likewise contemplated that the orientation means may be set and altered by the user in the field.

Figure 3:
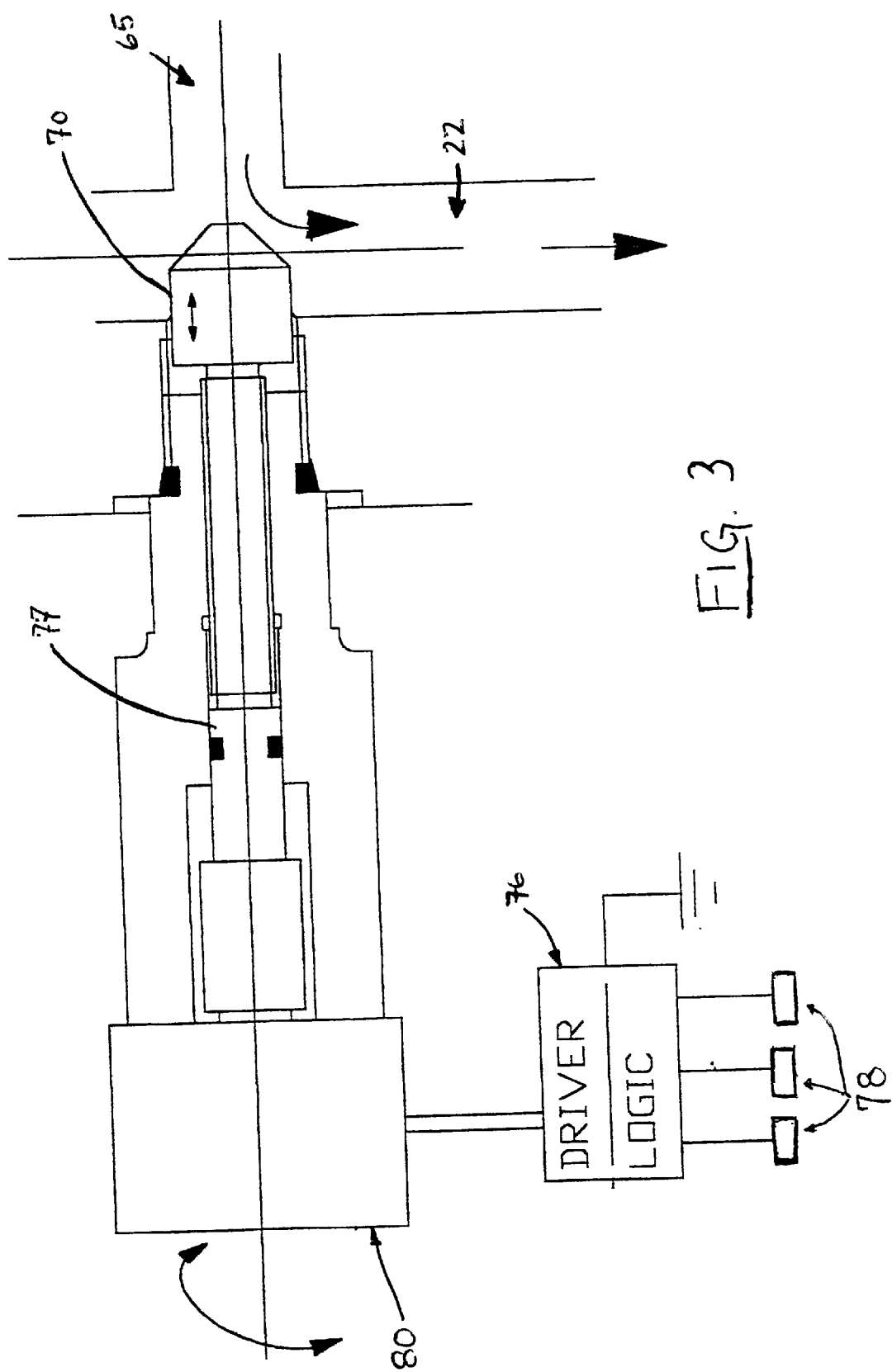
FIG. 3 of the drawings is a schematic depiction of the automatic adjustment means of the secondary flow control means of the present invention.

In another embodiment, as shown in FIG. 3, orientation means 72 may additionally comprise means 74 for automatically adjusting the orientation means. Automatic adjusting means 74 comprises electronic logic controller 76, at least one sensor, such as sensor 78 and stepper motor 80. Stepper motor 80 is coupled to threaded member 77. Sensor 78 may comprise a temperature sensor positioned in the fluid flow of any one of the fluids being cooled, a temperature sensor positioned to read ambient temperature, or a sensor configured to read other temperatures or pressures similar to these explained above relative to sensors 54–57. Upon receiving certain predetermined inputs from sensor 78, electronic logic controller 76 directs stepper motor 80 to rotate in either of a clockwise or counter-clockwise direction. In turn, threaded member 77 is then adjusted to force plunger 70 into passage 22, or to pull plunger 70 away from passage 22. As a result, fluid flow through passage 22 can be increased or reduced and, in turn, controlled, depending on the conditions.

In operation, as shown in FIG. 2 high pressure side 129 of pump 130 is first connected to inlet 26. Next, passage 22 is attached to inlet 139 of fan motor 140 and passage 23 is attached to outlet 141 of fan motor 140. Lastly, passage 24 is associated with reservoir 150, and low pressure side 131 of pump 130 is likewise associated with reservoir 150. Once fully connected, upon activation of engine 110, pump 130 begins to spin, driving fluid into control system 10. As the motor speed (rpm) increases, the speed of the pump likewise increases and larger flow is directed through pump 130.

As the fluid enters control system 10, the fluid is directed into inlet 26. In turn, the fluid passes through orifice 37 and opening 38 of flow control float 32, through opening 28 and into passage 22. As the fluid flow provided by pump 130 increases to a predetermined level, the fluid is forced against plate 39 of flow control float 32 wherein it overcomes biasing means 34. In turn, flow control float 32 begins to move away from inlet 26. As a certain predetermined fluid flow rate, flow control float 32 is displaced by the fluid so as to expose bypass outlet 30. At such time, maximum desired flow to passage 22 has been achieved, and any fluid flow delivered by the pump in excess of the maximum desired flow rate is diverted by bypass outlet 30 into passage 27 which is in communication with passage 24 and reservoir 150. In this manner, while the fluid flow that is delivered by the pump varies with engine speed (inasmuch as the pump is coupled to and rotates with the crankshaft of the engine), the maximum flow to the fan 140 and, in turn, the speed of the fan can be limited.

By adjusting biasing means 34, the quantity of fluid flow permitted into passage 22, prior to displacing the flow control float to the extent that bypass outlet 30 is exposed, can be varied. Currently, it is contemplated that such an adjustment can be set and sealed at the factory (where the particular setting can be varied according to the particular climate and conditions to which the equipment will likely be exposed). However, it is likewise contemplated that adjustments can be made in the field. While other values are contemplated, a typical pressure through valve 20 is about 1500 psi at outlet 28, and about 1700 psi at inlet 26. Such pressures are sufficient to provide for a fan to cool the fluids of, for example, a Dressta Model No. TD-40E bulldozer. The particular flow rates and pressures can be determined for particular applications and conditions, and the application is not limited to any particular pressure.

Of the fluid that passes through passage 22, the fluid statically communicates with cavity 81 of first check valve 42. As explained above, this fluid essentially forces check valve 42 to remain in the default closed position unless the pressure in passage 23 is greater than the pressure in passage 24 and the check valve rating. The fluid within passage 22 proceeds into fan motor 140, and in turn, powers the rotation fan 153. After powering the fan, the fluid exits fan motor 140 at outlet 141 and proceeds into passage 23. Typically, the fluid in this region is at about 30 psi, however, the exact pressure will depend on the particular application and the application is not limited to any particular pressures.

Since the pressure in passage 23 is greater than the sum of the pressure in passage 24 and the pressure rating of check valve 44, check valve 44 will be forced into the open position and the fluid passes from passage 23 through check valve 44 into passage 24 and, in turn, reservoir 150. From the reservoir, the fluid can be drawn and recirculated by pump 130.

If the pressure increases in inlet 26 beyond the rating of the pressure relief valve then the pressure relief valve will be triggered and the fluid will be directed to passage 24 and ultimately to reservoir 150. The pressure rating for the pressure relief valve will vary and depend on the particular application. The pressure relief valve is designed to prevent catastrophic damage to the pump, the control system and the fan motor. Generally, pressure relief valve will be triggered only in a situation wherein one of the components has failed, and pressure of the fluid reaches heightened levels. Of course, such a pressure relief valve can be associated with other regions of the system, such as with the pump or the fan motor itself, or multiple relief valves can be utilized to increase safety.

When the engine ceases operation, pump 130 likewise ceases providing fluid, and the fluid pressure within passage 22 responds accordingly. Specifically, the pressure within passage 22 drops significantly. To prevent cavitation in fan motor 140, which occurs when the fan continues to rotate due to inertia even though fluid flow has ceased, as the pressure in passage 23 reduces to less than the check valve rating of check valve 44, check valve 44 will return to the closed position and passage 23 will no longer be in communication with passage 24. However, at such time, the pressure in passage 22 is substantially lower than both the pressure in passage 23 and the check valve rating of check valve 42. Correspondingly, check valve 42 will be forced open as long as the flow in passage 23 exceeds the check valve rating of check valve 42. Thus, the fluid will be permitted to recirculate to fan 140 through passage 23, check valve 42 and passage 22 until the fan naturally slows down and stops. Thus, cavitation, and, in turn, damage to the fan motor can be minimized.

In certain situations it is desirable to increase the fan speed in response to certain unusual or temporary conditions. For example, if equipment is being utilized so that the temperature of one of the operating fluids, such as coolant, oil, hydraulic fluid or transmission fluid, increases beyond a predetermined limit, it becomes desirable to increase the fan speed to increase the cooling capacity of the heat exchanger/radiator until the fluid temperatures return to a normal operating range.

In such a condition, the secondary speed control means 14 is activated. Specifically, the second solenoid 73 receives an input from, for example, temperature sensor 54 which is associated with one of the operating fluids, or with the engine/transmission itself, and the solenoid is energized. In turn, the energization directs inlet 60 into fluid communication with third outlet 65. Thus, an additional quantity of fluid is directed into passage 65, and in turn, passage 22, in addition to that which is passing through first limiting means 12 into passage 22. With the introduction of additional fluid into passage 22, the speed of fan motor 140 increases. The quantity of fluid that is directed by the second speed control means 14 into passage 22 is limited by the relative positioning of plunger 70 of adjustment means 56. As explained above, the fluid flow rate from outlet 65 into passage 22 can be increased or decreased as desired.

Figure 4:
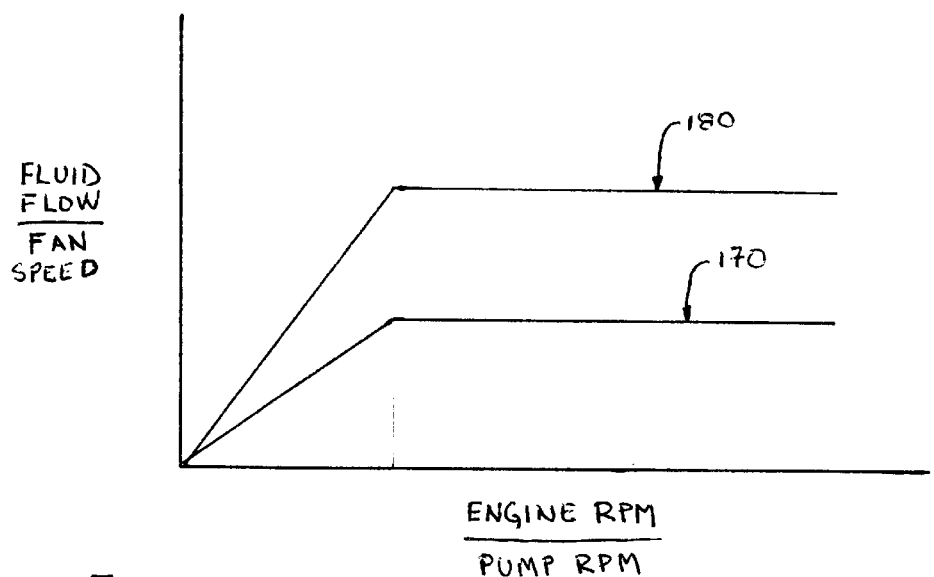
FIG. 4 of the drawings is a graph which plots operating speed of the engine/pump relative to operating speed of the fan which as controlled by the primary flow control means both with and without cooperation from secondary flow control means of the present invention.

FIG. 4 of the drawings shows a graph which includes a plot of engine rpm (pump rpm) versus fluid flow (fan motor speed). The line 170 represents the results when only the primary control means is operating. The line 180 represents the results when the primary control means is operating and when the secondary control means is likewise providing fluid passage into passage 22 to fan motor 140.

Once the temperature of the fluids which activated sensor 54 returns to a predetermined non-elevated range, solenoid 73 is deenergized and inlet 60 is precluded from fluid communication with outlet 65.

In the embodiment of the invention shown in FIG. 2, an additional solenoid can be associated with secondary speed control means 14. In such an embodiment, activation of the first solenoid 71 directs inlet 61 into fluid communication with outlet 62, passage 24, and in turn, reservoir 150. Thus, to the extent that outlet 62 has the requisite capacity, the majority, if not all fluid entering inlet 26 will be directed to the outlet 62, and in turn, to reservoir 150. In such a condition, the fan will spin slowly, if at all, and the fluids will heat up quickly. Accordingly, such a condition provides a means by which to bypass the control valve to permit the rapid warm-up of the engine to operating temperature. This is quite useful in cold climates especially in the situation where the operator's cabin is heated via engine coolant. Solenoid 71 can be associated with a sensor or other selective activation means such as a user activated switch, a cabin temperature switch, a timer switch or other type of automatic or manual activation means.

With such a system, use of a non-complex, relatively inexpensive control system for a hydraulic cooling system can be achieved. Indeed, the passages can be machined into a billet of metal alloy material such as steel, aluminum, brass, among others. The valves and adjustment means can be threadedly mated to the billet and may comprise conventionally available components.

Such a system provides a first means for controlling the fan to limit the maximum flow to the fan motor regardless of engine and pump speed, and a second means for controlling the fan motor to selectively permit increased flow in certain instances or decreased flow in certain specific conditions.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. An adaptive cooling system control system for controlling fluid delivery from a pump to a fan motor comprising:

an inlet for receiving fluid from a pump;

an outlet for delivering fluid to a fan motor;

a return passage from an outlet of the fan motor;

primary means for controlling the speed of a fan, the primary controlling means comprising a bypass valve including a first passage in fluid communication with the inlet and the outlet, and a bypass passage selectively communicable with the inlet, the bypass passage being placed in fluid communication with the inlet upon receiving fluid from a pump in excess of a predetermined desired quantity of such fluid; and means for minimizing cavitation of a fan after fluid delivery from a pump ceases, the cavitation minimizing means comprising means for circulating fluid from the return passage into the inlet until the pressure in the return passage falls below a predetermined pressure, the circulating means comprises:

a first check valve having a first rating, an open position and a closed position, the first check valve associated with the return passage and providing a fluid conduit from the return passage to a fluid outlet when in the open position; and a second check valve having a second rating, an open position and a closed position, the second check valve being associated with the return passage, wherein the second check valve provides a fluid conduit between the return passage and the inlet when in the open position, the second rating being a pressure higher than the first rating;

whereupon cessation of fluid delivery from a pump, and decrease in flow of fluid in the inlet, the second check valve returns to the closed position, and the first check valve is prompted into the open position, to, in turn, facilitate circulation of fluid from the return passage through the first check valve into the inlet until the pressure within the return passage falls below a predetermined pressure.

2. The system of claim 1 wherein the first rating is less than 5 psi, and the second rating is less than 30 psi.

3. The system of claim 1 wherein the fluid outlet is associated with a fluid reservoir.

4. An adaptive cooling system control system for controlling fluid delivery from a pump to a fan motor comprising:

an inlet for receiving fluid from a pump;

an outlet for delivering fluid to a fan motor;

primary means for controlling the speed of a fan, the primary controlling means comprising a bypass valve including a first passage in fluid communication with the inlet and the outlet, and a bypass passage selectively communicable with the inlet, the bypass passage being placed in fluid communication with the inlet upon receiving fluid from a pump in excess of a predetermined desired quantity of such fluid; and secondary means for controlling the fluid flow to a fan motor, the secondary means comprises a second valve positioned between the inlet and the outlet, the second valve being selectively positionable so as to selectively provide a conduit between the inlet and the outlet.

5. The system of claim 4 wherein the bypass valve includes means for altering the quantity of excess fluid flow required to place the bypass passage into communication with the inlet.

6. The system of claim 4 wherein the bypass valve includes:

a flow control float slidably positionable relative to the inlet;

means for biasing the flow control float between the inlet and the bypass passage, wherein a predetermined flow rate is capable of overcoming the biasing means, and in turn, placing the inlet into fluid communication with the bypass passage.

7. The system of claim 6 wherein the bypass valve further includes means for adjusting the biasing means, to in turn, alter the quantity of fluid flow required to place the bypass passage into fluid communication with the inlet.

8. The system of claim 4 wherein the inlet further includes a pressure relief valve, to preclude undesirable elevated fluid pressure within the system.

9. The system of claim 4 wherein the second valve includes at least one sensor and means associated with the at least one sensor for activating the selective positioning of the valve.

10. The system of claim 9 wherein the at least one sensor comprises at least one of a temperature sensor, a pressure sensor and a manually activated switch.

11. The system of claim 9 wherein the activating means comprises a solenoid associated with the at least one sensor, whereupon energization of the solenoid positions the valve so as to place the inlet and the outlet in fluid communication.

12. The system of claim 9 wherein the secondary means further includes means for adjusting the fluid flow capacity of the conduit between the inlet and the outlet.

13. The system of claim 12 wherein the adjusting means comprises a selectively positionable plunger positioned within the conduit.

14. The system of claim 12 wherein the adjusting means comprises means for automatically adjusting the quantity of fluid directed through the conduit based on predetermined sensed conditions.

15. The system of claim 14 wherein the automatic adjusting means comprises:

a selectively positionable plunger positioned within the conduit of the secondary means;

an electronic controller;

at least one sensor associated with the controller;

a stepper motor associated with the controller and the plunger wherein rotation of the stepper motor, controlled by the controller in response to an input received from the at least sensor, operably alters the position of the plunger to facilitate one of greater or lesser fluid flow through the conduit.

16. The system of claim 4 wherein the secondary flow control means further including means for bypassing the outlet, to in turn, substantially preclude rotation of a fan.

17. The system of claim 4 further including means for selectively activating the bypassing means.

18. An adaptive cooling system control system for controlling fluid delivery from a pump to a fan motor comprising:

an inlet in fluid communication with a pump;

an outlet in fluid communication with a fan motor; and a bypass valve and a control valve positioned in parallel;

the bypass valve including:

a first passage in fluid communication with each of the inlet and the outlet; and a bypass passage selectively communicable with the inlet, the bypass passage being placed in fluid communication with the inlet upon receiving fluid from a pump in excess of a predetermined desired quantity of such fluid; and the control valve including:

a control valve inlet associated with the inlet;

a first control valve outlet associated with the outlet, the first control valve inlet being selectively placed in fluid communication with the first control valve outlet.

19. The system of claim 18 wherein the bypass valve comprises a mechanically actuated hydraulic valve.

20. The system of claim 18 further comprising means for adjusting the flow from first control valve outlet.

21. The system of claim 20 wherein the adjusting means comprises an adjustable plunger associated with the first control valve outlet.

22. The system of claim 21 further comprising a stepper motor associated with the plunger, the stepper motor capable fo adjusting the plunger into a desired predetermined position.

23. The system of claim 18 wherein the flow control valve further includes:

a second control valve outlet associated with the bypass passage of the bypass valve, the flow control valve being selectively placed in fluid communication with either of the first control valve outlet and second control valve outlet.

24. An adaptive cooling system control system for controlling fluid delivery from a pump to a fan motor comprising:

an inlet in fluid communication with a pump;

an outlet in fluid communication with a fan motor; and a primary fan speed control means and a secondary fan speed control means positioned in parallel and each associated with the inlet and outlet, the primary fan speed control means including a valve capable of delivering fluid to the outlet at a predetermined flow, and the secondary fan speed control means comprising a valve capable of delivering fluid to the outlet at a predetermined flow, to, in turn, facilitate the cooperative control of an associated fan motor.

25. The system of claim 24 wherein the valve of the primary fan speed control means includes a substantially fixed maximum flow rate therethrough, and, wherein the valve of the secondary fan speed control means includes means for adjusting the maximum flow rate of fluid therethrough.

26. An adaptive cooling system control system for controlling fluid delivery from a pump to a fan motor comprising:

an inlet fluidly communicable with a pump;

an outlet fluidly communicable with an inlet of a fan motor;

a return fluidly communicable with an outlet of a fan motor;

a tank fluidly communicable with the return and with a pump;

a first check valve positioned between the return and the outlet, the first check valve positionable from a first closed position, to a second open position, the first check valve positioned in the closed position as long as the pressure within the outlet exceeds the pressure in the return;

a second check valve positioned between the return and the tank, the second check valve positionable from a first closed position, to a second open position, the second check valve positioned in the open position as long as the pressure within the outlet exceeds the pressure in the return, wherein, the first and second check valves cooperate to substantially preclude cavitation of an associated fan motor.

\* \* \* \* \*